Feb. 9, 1960          A. V. OSBORNE          2,924,441
FLUID DISTRIBUTOR PLATE FOR COUNTERFLOW CONTACT APPARATUS
Filed Jan. 24, 1956
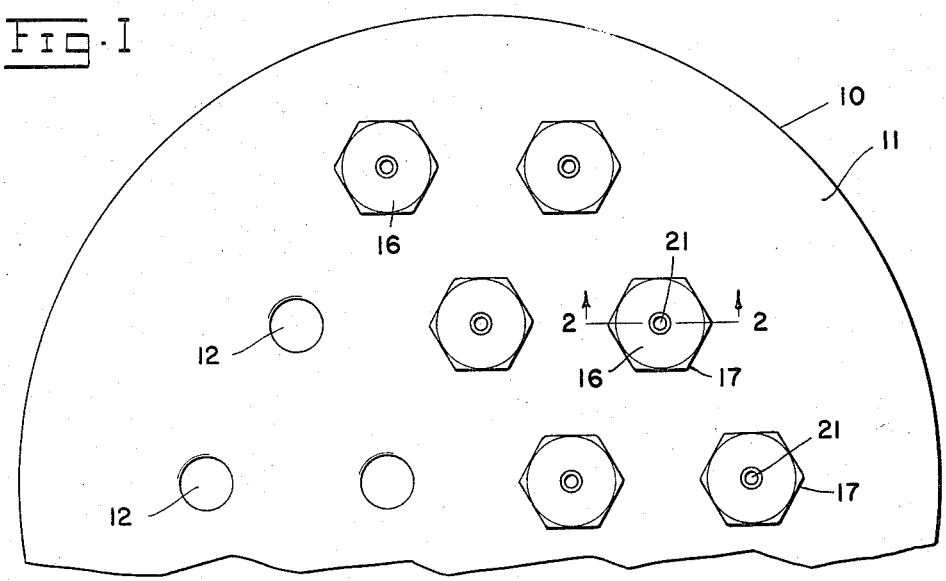
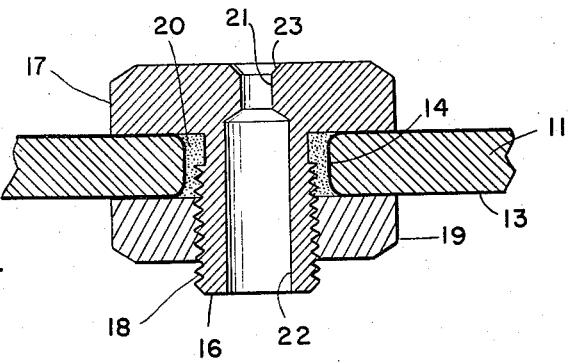
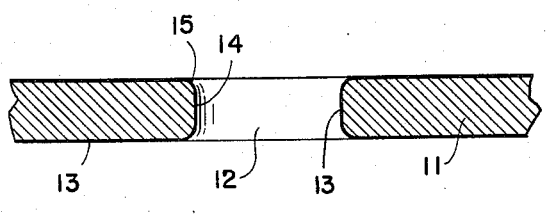
INVENTOR,
ALEC V. OSBORNE
BY
HIS ATTORNEY.

United States Patent Office 2,924,441
Patented Feb. 9, 1960

2,924,441

FLUID DISTRIBUTOR PLATE FOR COUNTER-FLOW CONTACT APPARATUS

Alec V. Osborne, Brighton, N.Y., assignor to Pfaudler Permutit Inc., Rochester, N.Y., a corporation of New York Application January 24, 1956, Serial No. 560,934

7 Claims. (Cl. 261—113)

This invention relates to distributor plates for producing counterflow contact of liquids and gases in processing towers, columns and like apparatus. The fluids employed in such apparatus are commonly corrosive and one object of the invention is to provide a distributor plate of improved corrosion-resisting construction.

Another object is the provision of a distributor plate of the above character constructed of metal and completely and effectively covered and protected by a coating of vitreous or other corrosion-resisting material.

A further object is to provide an improved distributor plate such as described and capable of being readily and economically manufactured and installed in a processing tower or column.

To these and other ends the invention resides in certain improvements and combinations of parts, all as will be hereinafter more fully described, the novel features being pointed out in the claims at the end of the specification.

In the drawings:

Fig. 1 is a top plan view, partly broken away, of a distributor plate embodying the present invention;

Fig. 2 is an enlarged sectional elevation on line 2—2 in Fig. 1, and

Fig. 3 is a view similar to Fig. 2 with parts omitted.

The embodiment of the invention herein disclosed by way of illustration comprises preferably a distributor plate of the circular shape commonly employed and shown at 10 in Fig. 1. This plate member comprises a sheet of metal 11 of shape-maintaining thickness and rigidity and about ½ inch thick in the present instance. The metal preferred for this purpose, because of its corrosion-resisting qualities, is stainless steel, but other metals may be employed. This plate is covered and protected by a coating of glass or other corrosion-resisting vitreous material fused to the plate in any known or suitable manner to further increase its resistance to corrosion.

The distributor plates of the character described are commonly formed with a multiplicity of perforations spaced from one another over the area of the plate and of relatively small diameter to afford intimate contact by counterflow of the fluids to be treated, as well understood in the art. However, the coating or glazing of a plate formed with perforations of such small diameter presented a problem arising from the difficulty of applying and fusing the coating material to the side walls in the perforations, so as to insure complete and adequate coating of the metal of the plate. I have found that this problem can be satisfactorily solved by the means which will now be described.

For this purpose, the perforations 12 in the plate are enlarged to a diameter, of say 13/32 of an inch as the present instance, as shown in Fig. 3, such that the glass coating 13 is readily applied to and fused over the side walls 14 of each perforation 12. The intersections of the perforation with the opposite faces of the plate are preferably curved as at 15 on a radius of about ⅛ inch, as shown, to eliminate sharp edges and facilitate the glazing.

While the enlargement of the perforations thus overcomes the difficulty of completely applying the glass coating, perforations of such diameter are too large to accomplish the desired counterflow contact by small streams or jets. However, it has been found that this problem also can be overcome, by filling the perforations 12 with bushings of corrosion-resisting material and forming the flow transmitting perforation of desired diameter in the bore of the bushing, so that the bushing serves in effect as a reducing nozzle. For this purpose the bushing 16 (Fig. 2) is preferably formed of a suitable corrosion-resisting, moldable organic plastic material such as polyethylene, Teflon or the like. The bushing has an outside diameter of, say 1 inch so as to substantially fill the perforation in the glazed plate 11 and the bushing is formed at one end with a hexagonal head 17. The other end of the bushing, extending beyond the opposite face of the plate, is threaded as at 18 and receives a hexagonal nut 19 by means of which the bushing is securely clamped in place in the perforation. For increased protection, a layer of Penchlor or other known corrosion-resisting cement 20 is applied between the bushing and the side walls 14 of the perforation 12 in the plate, to further seal the latter against contact with the treated materials.

The bushing 16 is formed with a flow transmitting bore comprising, for a minor portion of its length, a portion 21 of lesser diameter adjacent its inlet end and a portion 22 of larger diameter throughout the remainder of its length, as shown. Portion 21 is preferably of limited length of, say ¼ of an inch and has a diameter of, say ¼ of an inch, predetermined to produce the desired fluid transmitting capacity. The entrance 23 of this portion is preferably formed with a chamfer of about 1/16 of an inch at an angle of 45° to the axis of the bore. This provides a capacity-controlling portion of short length with a minimum likelihood of clogging. The remainder 22 of the bore may have a diameter of, say, ½ inch for freely transmitting the flow.

It is apparent from the above description that the invention provides an efficient distributor plate capable of being readily manufactured and installed and having a high degree of protection against corrosion by the treated fluids.

It will thus be seen that the invention accomplishes its objects and while it has been herein disclosed by reference to the details of a preferred embodiment, it is to be understood that such disclosure is intended in an illustrative, rather than a limiting sense, as it is contemplated that various modifications in the construction and arrangement of the parts will readily occur to those skilled in the art, within the spirit of the invention and the scope of the appended claims.

I claim:

1. A distributor plate for producing counterflow contact of corrosive fluids comprising a metal plate formed with a multiplicity of spaced perforations therethrough each having a diameter substantially greater than that of counterflow openings to afford access for applying a coating to the side walls thereof, a coating of corrosion-resisting material different from the material of said plate and forming a thing film covering said plate and said side walls of the perforations, and a reducer bushing of corrosion-resisting material filling each of said coated perforations and formed with a bore of substantially less diameter than said coated plate perforations to afford a fluid transmitting counterflow opening of predetermined effective capacity.

2. A distributor plate for producing counterflow contact of corrosive fluids comprising a metal plate formed with a multiplicity of spaced perforations therethrough each having a diameter substantially greater than that of counterflow openings to afford access for applying a coating to the side walls thereof, the intersections of said side walls with the face of said plate having a smoothly rounded shape, a coating of corrosion-resisting, vitreous material covering said plate and said side walls of the perforations, and a reducer bushing of corrosion-resisting material filling each of said coated perforations and formed with a bore of substantially less diameter than said coated plate perforations to afford a fluid transmitting counterflow opening of predetermined effective capacity.

3. A distributor plate for producing counterflow contact of corrosive fluids comprising a metal plate formed with a multiplicity of spaced perforations therethrough each having a diameter substantially greater than that of counterflow openings to afford access for applying a coating to the side walls thereof, a coating of corrosion-resisting material covering said plate and side walls of the perforations, and a reducer bushing of corrosion-resisting moldable organic plastic material sealed in each of said openings by an interposed layer of corrosion-resisting cement, said bushing having a bore of substantially less diameter than said coated plate perforations to afford a fluid transmitting counterflow opening of predetermined effective capacity.

4. A distributor plate for producing counterflow contact of corrosive fluids comprising a metal plate formed with a multiplicity of spaced perforations therethrough, each having a diameter substantially greater than that of counterflow openings to afford access for applying a coating to the side walls thereof, a coating of corrosion-resisting material covering said plate and said side walls of the perforations, and a reducer bushing of corrosion-resisting material filling each of said perforations and formed with a fluid transmitting bore of predetermined effective capacity, said bushings having one end formed with a head for contact with one side of said plate member and its other end threaded and provided with a nut for contact with the other side of said plate member.

5. A distributor plate for producing counterflow contact of corrosive fluids comprising a plate member formed with a multiplicity of spaced perforations therethrough, each having a diameter substantially greater than that of counterflow openings to afford access for applying a coating to the side walls thereof, a coating of corrosion-resisting material covering said plate and said side walls of the perforations, and a reducer bushing of corrosion-resisting plastic material filling each of said coated perforations and formed with a fluid transmitting bore, said bore having for a minor portion of its length a reduced diameter of predetermined fluid transmitting capacity and having the remainder of its bore enlarged in diameter to facilitate fluid transmission, and means for sealing said bushings in said perforations.

6. A distributor plate for producing counterflow contact of corrosive fluids comprising a metal plate formed with a multiplicity of spaced perforations therethrough, each having a diameter substantially greater than that of counterflow openings to afford access for applying a coating to the side walls thereof, a coating of corrosion-resisting material covering said plate and said side walls of the perforations, and a reducer bushing of corrosion-resisting material filling each of said perforations and formed with a fluid transmitting bore, said bushing having one end formed with a head for contact with one side of said plate member and its other end threadedly provided with a nut for contact with the other side of said plate member, said bore having for a minor portion of its length a reduced diameter of predetermined fluid transmitting capacity and having the remainder of its bore enlarged in diameter to facilitate fluid transmission.

7. A distributor plate for producing counterflow contact of corrosive fluids comprising a metal plate formed with a multiplicity of spaced perforations therethrough, each having a diameter substantially greater than that of counterflow openings to afford access for applying a coating to the side walls thereof, the intersections of said side walls with the faces of said plate having a smoothly rounded shape, a coating of corrosion-resisting vitreous material covering said plate and said side walls of the perforations, and a reducer bushing of corrosion-resisting moldable organic plastic material filling each of said perforations and formed with a fluid transmitting bore, said bushing having one end formed with a head for contact with one side of said plate member and its other end threadedly provided with a nut for contact with the other side of said plate member, said bore having for a minor portion of its length a reduced diameter of predetermined fluid transmitting capacity and having the remainder of its bore enlarged in diameter to facilitate fluid transmission.

References Cited in the file of this patent

UNITED STATES PATENTS

| | | |
|---|---|---|
| 1,890,536 | Flanders et al. | Dec. 13, 1932 |
| 1,920,623 | Becker | Aug. 1, 1933 |
| 2,059,044 | Seelig et al. | Oct. 27, 1936 |
| 2,201,949 | Wentworth | May 21, 1940 |
| 2,523,126 | Long | Sept. 19, 1950 |
| 2,607,662 | Huff | Aug. 19, 1952 |
| 2,662,001 | Burns et al. | Dec. 8, 1953 |
| 2,711,308 | Cogan | June 21, 1955 |